United States Patent Office 2,985,624
Patented May 23, 1961

2,985,624

PREPARATION OF ZINC POLYESTERS

Rudolph Paul Arndt, Muskegon, Mich., assignor to Anaconda Wire and Cable Company, a corporation of Delaware No Drawing. Filed Oct. 9, 1956, Ser. No. 614,820

4 Claims. (Cl. 260—75)

This invention relates to a new class of metallopolyesters, in which a metallic element forms a part of the polyester structure. More particularly, the invention is directed to zinc polyesters possessing as their common structural feature the presence of a divalent dicarboxyzinc linkage in the polymer molecule. The zinc polyesters of the invention are auto-catalytically polymerized on heating to form hard films, and are particularly suited for use in preparing insulated conductors of the enameled magnet wire type. The invention further provides a process for preparing the zinc polyesters by reacting a zinc salt of an organic acid together with a polyester containing a terminal carbalkoxy group.

Using polyesters containing a terminal carbalkoxy group, I have found that a zinc salt of an organic acid reacts with two carbalkoxy groups to displace the alkyl substituents and form a divalent dicarboxyzinc linkage in the polyester structure. Accordingly, the process of this invention for preparing zinc polyesters comprises reacting a polyester containing at least one terminal carbalkoxy group together with a zinc salt of an organic acid to form a zinc polyester containing at least one divalent dicarboxyzinc linkage, which may be represented by the following structural formula:

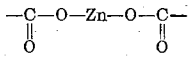

The presence of this linkage in a polyester moiety tends to modify the basic properties of the polyester, and gives rise to several new properties which uniquely characterize the zinc polyesters. Of these new properties, the ability to wet metallic surfaces and to form thermally-stable films make the zinc polyesters especially suitable for use in wire coating enamels. A solution in an inert solvent of the zinc polyester exhibits excellent wetting properties for metallic surfaces, and may be used directly as a dipping enamel for a bare metallic conductor. Subsequent heating of the wet-coated wire, to remove the inert solvent, results in an auto-catalyzed polymerization of the zinc polyester to form a hard continuous insulating film surrounding the wire. Films of this nature are able to withstand severe thermal shock, and are resistant to thermal degradation or appreciable loss of dielectric strength due to exposure to elevated temperatures, and thus provide suitable insulation for magnet wire intended for use in motors or coils operating at high temperatures.

The molecular configuration induced by the chemical structure of the initial polyester, containing a terminal carbalkoxy group, from which the zinc polyester is subsequently formed, contributes the basic polymer properties such as melting point, amorphous transition temperature, crystallinity, solubility and flexibility, which are modified by inclusion of the divalent dicarboxyzinc linkage in the polyester moiety. Linear polyesters, prepared from aromatic dicarboxylic acids and straight-chain aliphatic glycols, are generally high melting and crystalline because of the rigidity imposed on the polymer chains by the aromatic ring. Conversely, those polyesters prepared from aliphatic dicarboxylic acids are lower melting and amorphous since the internal rotation of the aliphatic linkages tends to allow the polymer chains to become flexible. In any case, however, the inclusion of zinc in the polyester structure generally tends to increase the melting point and the degree of polymerization of the polyester, due to the auto-catalytic effect of the divalent dicarboxyzinc linkage of the zinc polyester.

Preparation of the initial polyester containing a terminal carbalkoxy group, from which the zinc polyester is prepared, may be most advantageously effected by reacting a dicarboxylic diester with at least one aliphatic polyhydroxy alcohol, preferably in the presence of a polyesterification catalyst, such as litharge and sodium acetate or sodium hydride. The reaction is controlled so that the polyester contains from 5 to 50 percent of the original equivalent weight of carbalkoxy groups present in the dicarboxylic diester. Although precise control of the degree of polymerization of the polyester is difficult, an approximation of the molecular weight of the polyester may be made from a measurement of the amount of alcohol displaced from the carbalkoxy groups as a result of the polyesterification reaction.

An unusually large number of aromatic dicarboxylic diesters has been found to be suitable for the preparation of the initial polyester. Those aromatic dicarboxylic diesters which are of especial significance include diethyl p,p'-sulfonyldibenzoate, di-n-butyl p,p'-sulfonyldibenzoate, di-n-propyl m,p'-sulfonyldibenzoate, di-n-hexyl m,m'-sulfonyldibenzoate, dimethyl terephthalate, di-n-hexyl terephthalate, dimethyl isophthalate, p,p'-dicarboxymethyl benzophenone, bis-(p-carboxymethylphenyl) methane, p,p-dicarboxymethyl-diphenyl and 1,2-bis(p-carboxypropylphenoxy) ethane.

The aromatic dicarboxylic diester provides rigidity to the initial polyester structure, and hence the properties of the structure may be modified by using various polyhydroxy alcohols to give the polyester either a linear or a cross-linked structure. A highly linear initial polyester is formed when a straight-chain polymethylene glycol, such as ethylene glycol, is used in the polyesterification, while a branched, or cross-linked, product results when a trihydroxy alcohol, such as glycerol, is employed. When the zinc polyester is to be used for magnet wire insulation, I have found it particularly advantageous to prepare it from a co-polyalkylene carboxylate which contains a mixture of polyhydroxy alcohols, such as glycerol and ethylene glycol.

As a general rule, the particular polyhydroxy alcohol, suitable for the preparation of the initial polyester containing a terminal carbalkoxy group, is limited solely by availability. Many polyhydroxy alcohols have been found satisfactory, including the glycols, such as ethylene glycol, 1,3-propanediol, 1,4-butanediol, and 1,6-hexanediol, as well as those polyhydroxy alcohols containing more than two hydroxy groups, such as glycerol, sorbitol, mannitol, pentaerythritol, dipentaerythritol, methylglycerol, and 1,2,4-butanetriol.

A further modification in the properties of the initial polyester may be obtained by replacing a portion of the aromatic dicarboxylic diester with an ester of an aliphatic dicarboxylic acid, thereby conferring a somewhat amorphous character to the resultant polyester reaction product. In such cases I have found it advantageous to choose the replacement acid from the diesters of such acids as oxalic acid, adipic acid, succinic acid, sebacic and isosebacic acids, 2,2'-dimethylglutaric acid, maleic acid, fumaric acid, dimethylmalonic acid, and similar compounds. Generally, however, it is advisable to limit the molecular proportion of the replacement acid to not more than about one-third of the amount of dicarboxylic acid present in the initial polyester.

As indicated previously, the amount of alcohol displaced and removed during the polyesterification reaction serves as an excellent indication of the relative amount of carbalkoxy groups remaining in the initial polyester reaction product. After about 50 to 95 percent of the alcohol is removed, the polyester is fairly viscous, and is preferably dissolved in an inert solvent, such as cresylic acid or naphtha, to facilitate agitation of the mixture. However, the solvent may be dispensed with if a highly viscous reaction product is desired. Upon the addition of a substantially equivalent quantity of a zinc salt of an organic acid to the polyester solution, a low-boiling product distills off, leaving the zinc polyester.

Although no knowledge is available as to the exact mechanism of the reaction which occurs between the zinc salt and the terminal carbalkoxy groups, the ultimate reaction products are the divalent dicarboxyzinc linkage of the zinc polyester and the alkyl ester of the particular zinc carboxylate employed. To illustrate this reaction, when zinc acetate is reacted with a co-polyalkylene terephthalate, which was prepared by the polyesterification of dimethyl terephthalate together with glycerol and ethylene glycol so that approximately 10 percent of the original carbomethoxy groups are present, methyl acetate rapidly distills from the reaction mixture, leaving a zinc co-polyalkylene terephthalate containing at least one divalent dicarboxyzinc linkage.

Several reaction mechanisms may be postulated to explain the formation of the divalent dicarboxyzinc linkage in the zinc polyester structure. One plausible mechanism may be based on the supposition that the zinc salt of the organic acid functions as a Lewis acid in an electrophilic attack on the carbonyl-oxygen of the polyester, thereby forming a carbonium ion as a transistory intermediate, which immediately decomposes to form the mixed zinc salt of the polyester and the zinc carboxylate and the alkyl ester of the zinc carboxylate. Since this mixed zinc salt may also function as a Lewis acid, it is possible that a further reaction takes place between the mixed zinc salt and another polyester carbonyl-oxygen to form the zinc polyester containing a divalent dicarboxyzinc linkage. To illustrate this postulated mechanism, the general steps of the reaction between zinc acetate and the terminal carbomethoxy groups of a polyester are outlined in the following reaction sequence, in which M represents a polyester moiety and Ac represents an acetyl radical:

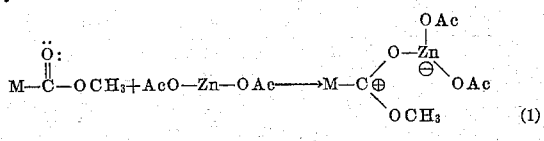

(1)

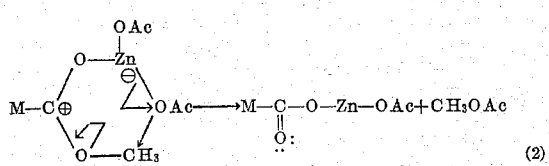

(2)

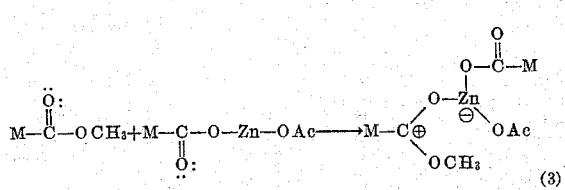

(3)

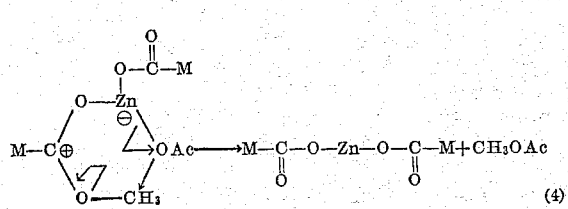

(4)

Although many zinc salts have been found to yield suitable zinc polyesters, I have found that the zinc salts of the lower organic acids, such as zinc acetate, zinc formate, zinc propionate, zinc butyrate, and zinc valerate, tend to react more readily with the initial polyester reaction product. In addition, the alkyl ester formed when these zinc salts are employed may be displaced from the reaction mixture by distillation, thereby favoring the formation of the zinc polyester. The zinc polyesters prepared from zinc acetate, in particular, have been found to form smooth, thermally-stable, and abrasion resistant insulating films. However, lacquers and enamels of zinc polyesters, prepared from other zinc salts, also yield excellent insulating films. Such zinc salts as zinc benzoate, zinc citrate, zinc naphthenate, zinc salicylate, zinc tartrate, and zinc octoate, are also suitable reactants.

The unusual wetting properties that a solution of the zinc polyester exhibits towards metallic surfaces enables the zinc polyesters of the invention to be applied to a bare metallic conductor merely by passing the wire through a bath of the lacquer. After baking the wet-coated wire in an oven to remove the carrier solvent, the resultant zinc polyester film is uniformly distributed about the periphery of the wire.

The following examples are illustrative of the zinc polyesters prepared in accordance with this invention:

EXAMPLE I

*Zinc co-polyglycerylethylene terephthalate*

A mixture of 1280 g. of dimethyl terephthalate, 245 g. of glycerol and 228 g. of ethylene glycol was melted in a resin reactor equipped with a stirrer and a packed distillation column bearing a water-cooled condensor. As soon as the mixture was completely fluid, at about 135° C., 0.25 g. of litharge and 0.12 g. of sodium acetate were added to catalyze the polyesterification reaction. The reaction mixture was heated for about two hours, during which time the temperature in the resin reactor slowly rose to about 280°–300° C., and methanol was continuously removed by distillation through the packed column.

After about 90 percent of the methanol had been removed, the viscous liquid polyester was diluted by the addition of a solvent pair, consisting of cresylic acid-naphtha (2:1), and the solution brought to a temperature of about 160° C. At this temperature, 80 g. of zinc acetate was added, and the mixture stirred until all of the zinc acetate had dissolved. During the addition and reaction of the zinc acetate with the polyester, methyl acetate distilled from the reaction mixture through the packed column, leaving the zinc co-polyglycerylethylene terephthalate dissolved in the solvent pair remaining in the resin reactor.

On evaporation of the solvent, a tough, flexible deposit of the zinc polyester remained. Because of the presence of the divalent dicarboxyzinc linkage in the zinc polyester structure, heating the material to ascertain the melting point resulted in a further polymerization to a more highly cross-linked film.

To illustrate the usefulness of the film-forming property of the zinc polyester, a solution of the zinc co-polyglycerylethylene terephthalate in cresylic acid-naphtha was applied to a bare copper conductor, and the wet-coated wire was heated in an oven at about 450° C. to remove the solvent. A tough, smooth film formed about the wire, and uniformly coated the conductor.

EXAMPLE II

*Zinc polyethylene terephthalate*

Zinc polyethylene terephthalate is formed by melting a mixture of 180 g. of dimethyl terephthalate and 92 g. of ethylene glycol in a reaction vessel, as described in Example I, and then adding a polyesterification catalyst, such as 0.02 percent of sodium hydride, as soon as the mixture becomes completely fluid. Upon addition of the catalyst, the reaction mixture is heated, with stirring, under an inert atmosphere for about four hours at 200° C., so that approximately 90 percent of the methanol distills through the packed column.

The liquid polyester is diluted with high-boiling naphtha ("Solvesso 100") and the temperature is brought to about 160° C. To this solution is added 80 g. of zinc acetate, with stirring, until all of the zinc acetate dissolves. The reaction of zinc acetate with the polyester causes methyl acetate to distill from the reaction mixture through the packed column, leaving zinc polyethylene terephthalate dissolved in naphtha. Upon evaporation of the solvent from a coating of the solution on a surface, a smooth flexible film of zinc polyethylene terephthalate remains.

EXAMPLE III

Zinc polyethylene terephthalate-adipate

A zinc polyethylene terephthalate-adipate is prepared by heating a mixture, consisting of 582 g. of dimethyl terephthalate, 174 g. of dimethyl adipate and 372 g. of ethylene glycol in the presence of 0.10 gram of sodium hydride, to a temperature of about 220° C. for two hours, during which time about 95 percent of the methanol is removed by distillation.

After diluting the co-polyester with cresylic acid, the mixture is brought to a temperature of about 180° C. and 90 g. of zinc propionate added, with stirring, until completely dissolved. The reaction of the zinc propionate with the remaining carbomethoxy groups results in methyl propionate distilling from the reaction mixture, leaving a zinc polyethylene terephthalate-adipate in the resin reactor.

Inasmuch as zinc polyethylene terephthalate-adipate contains a divalent dicarboxyzinc linkage, upon heating the material to temperatures of from 200–450° C. it further polymerizes and crosslinks to form an extremely tough but flexible film.

EXAMPLE IV

Zinc co-polyglycerylethylene p,p'-sulfonyldibenzoate

To prepare zinc co-polyglycerylethylene p,p'-sulfonyldibenzoate, a mixture of 1590 g. of diethyl p,p'-sulfonyldibenzoate, 245 g. of glycerol and 228 g. of ethylene glycol is heated, with stirring, in the presence of 0.25 g. of litharge and 0.12 g. of sodium acetate until about 90 percent of the ethanol is displaced from the reaction mixture by distillation.

The viscous reaction mixture is diluted with a solvent mixture, consisting of cresylic acid-naphtha (2:1), and brought to a temperature of about 200° C. Using vigorous stirring, 80 g. of zinc acetate is added to the mixture, and ethyl acetate continuously removed by distillation, leaving zinc co-polyglycerylethylene p,p'-sulfonyldibenzoate. Upon removal of the solvent by heating a coating of the solution on a surface to 450° C., a highly cross-linked zinc polyester film is formed.

EXAMPLE V

Zinc co-glycerylethylene terephthalate

A solution of zinc co-polyglycerylethylene terephthalate may be prepared by the procedure of Example I, except that an equivalent quantity of zinc naphthalate is added to the liquid polyester solution, and methyl naphthenate is collected by distillation through the packed column. Upon removal of the solvent, a semi-plastic mixture remained and solidified to a hard infusible resin on prolonged heating.

Application of a cresylic acid-naphtha solution of the zinc co-polyglycerylethylene terephthalate, prepared by the use of zinc naphthenate, to a bare copper conductor followed by baking the wet-coated wire at a temperature of from 200° to 450° C. results in a smooth yet thermally-stable insulating film of the zinc polyester on the surface of the wire.

I claim:

1. A polymeric zinc polyester of an aromatic dicarboxylic acid and an aliphatic polyhydroxy alcohol containing not more than about ten carbon atoms, said polyester containing at least one divalent dicarboxyzinc linkage attached to a benzenoid carbon atom through each of the carboxy carbon atoms of said divalent dicarboxyzinc linkage.

2. A polymeric zinc polyalkylene terephthalate in which the alkylene groups contain not more than about ten carbon atoms and which contains at least one divalent dicarboxyzinc linkage attached to a benzenoid carbon atom through each of the carboxy carbon atoms of said divalent dicarboxyzinc linkage.

3. A polymeric zinc polyester of an aromatic dicarboxylic acid and an aliphatic dicarboxylic acid and at least one aliphatic polyhydroxy alcohol containing not more than about ten carbon atoms, said polyester containing at least one divalent dicarboxyzinc linkage attached to a benzenoid carbon atom through each of the carboxy carbon atoms of said divalent dicarboxyzinc linkage.

4. A polymeric zinc polyglycerylethylene terephthalate containing at least one divalent dicarboxyzinc linkage attached to a benzenoid carbon atom through each of the carboxy carbon atoms of said divalent dicarboxyzinc linkage.

References Cited in the file of this patent

UNITED STATES PATENTS

| | | |
|---|---|---|
| 2,465,319 | Whinfield et al. | Mar. 22, 1949 |
| 2,665,263 | Howald | Jan. 5, 1954 |

OTHER REFERENCES

Fieser & Fieser Organic Chemistry, p. 162, 2nd ed., published 1950, Heath & Co., Boston.